Oct. 22, 1963 J. L. SWEENEY 3,108,272
CLOSED LOOP CONTROL SYSTEM
Filed June 30, 1958 5 Sheets-Sheet 1

INVENTOR.
John L. Sweeney
by Ralph R. Barnard
ATTORNEY

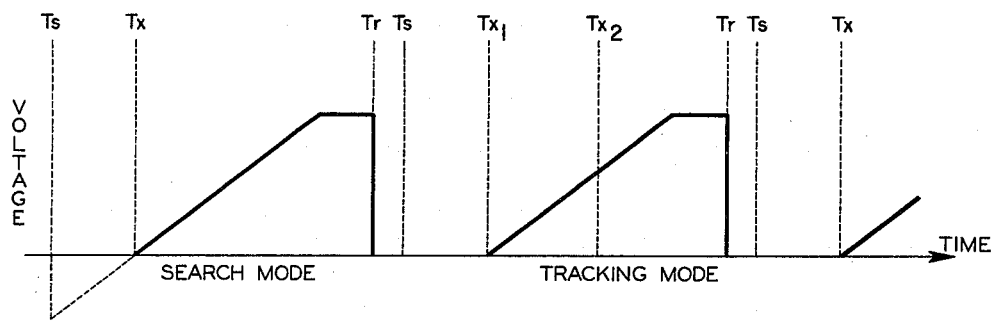
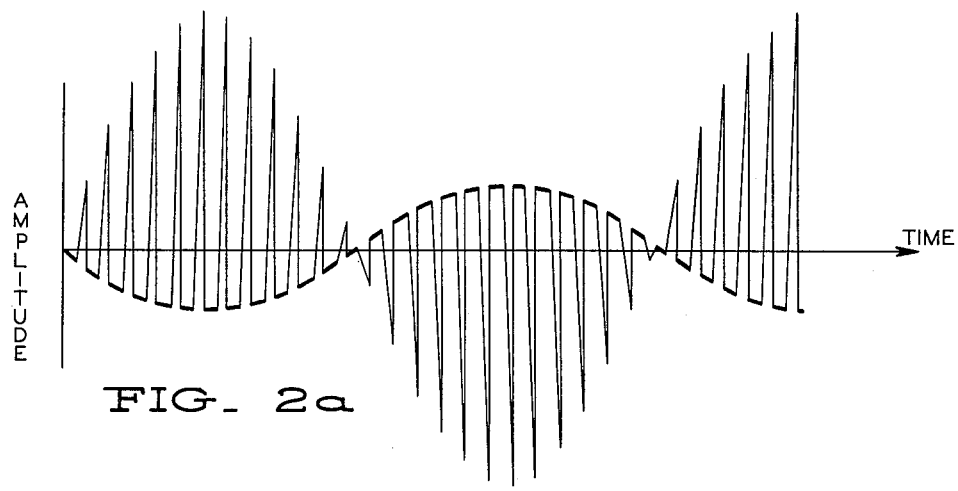

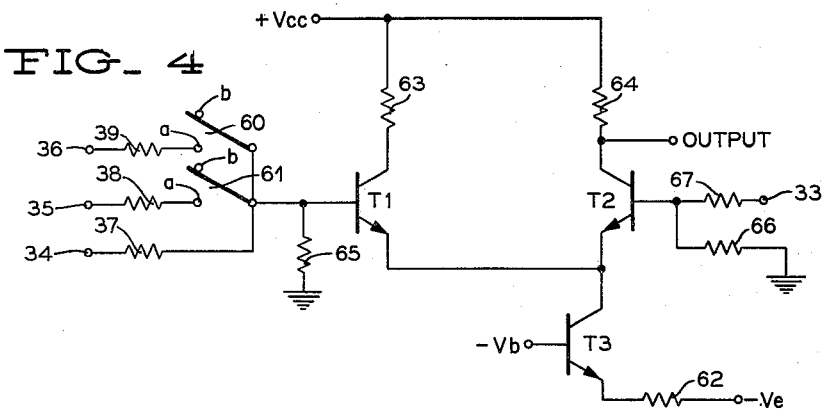
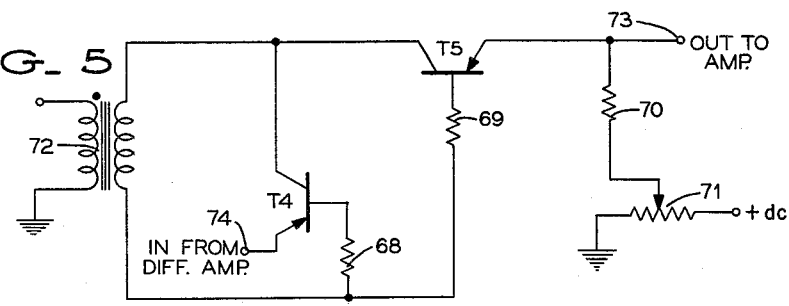
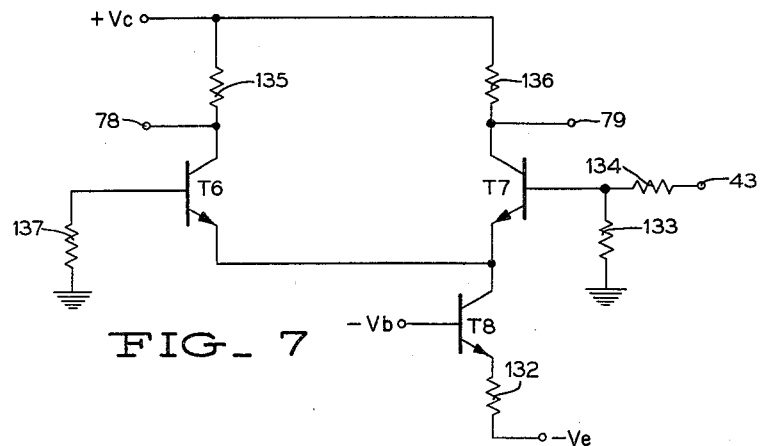

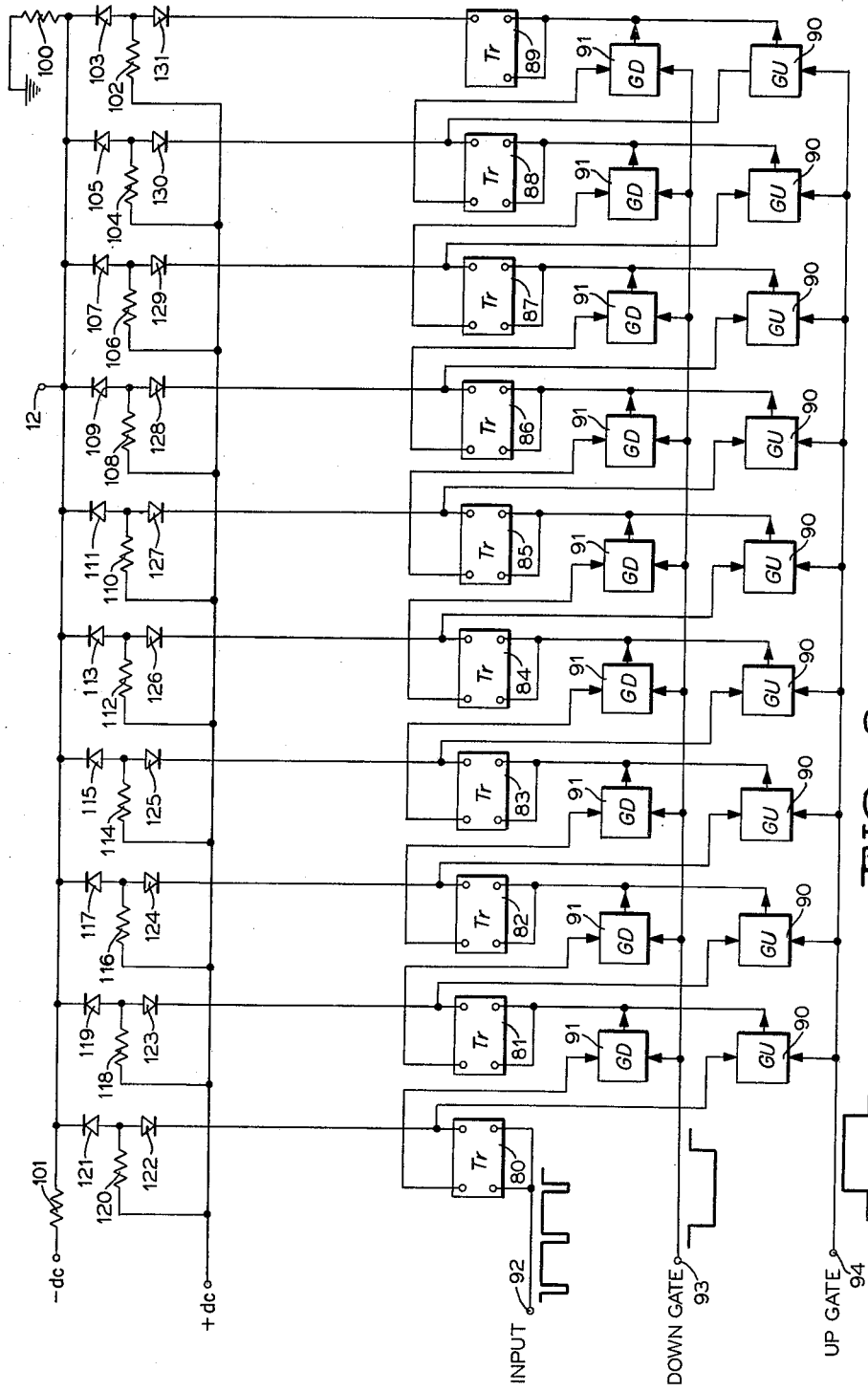
FIG_8

United States Patent Office 3,108,272
Patented Oct. 22, 1963

3,108,272
CLOSED LOOP CONTROL SYSTEM
John L. Sweeney, Johnson City, N.Y., assignor to International Business Machines Corporation, New York, N.Y., a corporation of New York
Filed June 30, 1958, Ser. No. 745,517
12 Claims. (Cl. 343—10)

This invention relates to improvements in electrical control circuitry and more particularly to a new and improved electronic sampled-data control system.

In the electronic telemetering, radar and television arts, it is often desired to maintain the deflection circuitry at a reference point on the face of a cathode ray tube. By way of concrete example, the cathode ray tube display for radar systems utilizes substantially saw-tooth electrical waveforms in deflection means for the generation of displays commensurate with range and bearing (or equivalent quantities) of the radar from a reference point. The deflection means may be either of the electromagnetic type using electrical saw-tooth current wave-forms or, alternatively, of the electrostatic type utilizing electrical saw-tooth voltage waveforms. One type of radar presentation is known as a plan position indicator (PPI). Therein, the point at which an electron beam emanating within a cathode ray tube impinges on its display surface is successively swept outward from a predetermined point, usually the geometric center of the tube face known as the origin. The direction of each successive beam sweep is rotated so that the locus of the terminus of each sweep generates a complete circle or a sector thereof.

Briefly, this presentation is often provided by utilizing the output voltage of a saw-tooth voltage generator calibrated in accordance with the particular range being presented to energize the stator of a conventional electro-mechanical resolver. The rotor of this resolver is positioned in accordance with the instantaneous bearing of the antenna of the radar, such that the two resolver windings carried on the rotor have voltages induced in each which are 90 degrees apart and commensurate with the instantaneous search sweep of the radar in both range and bearing orientation, respectively. One of these rotor windings is utilized to energize the vertical sweep circuits of the PPI and is known as the vertical resolver winding. The other is utilized to energize the horizontal sweep circuits of the PPI and is known as the horizontal resolver winding.

Conventionally, the output of the vertical resolver winding is then sent through an isolation stage to a clamping circuit. This clamping circuit functions to assure that the saw-tooth voltage waveform always commences at a desired reference voltage level corresponding to the predetermined arbitrary reference point, such as the geometric center of the face of the cathode ray tube. The output of the clamping stage is then amplified and applied to the cathode ray tube vertical deflection means comprising either the vertical portions of an electromagnetic deflection yoke or vertical electrostatic deflection plates. Likewise, the output voltage from the horizontal resolver winding is fed through an isolation stage, a clamping stage and an amplification stage to the horizontal portions of the electromagnetic deflection yoke or horizontal deflection plates.

Because of the trigonometric relationship between the voltages induced in the vertical and horizontal resolver windings, a sweep voltage is applied to the cathode ray tube having an instantaneous sweep magnitude commensurate with the instantaneous range of the radar search and an instantaneous sweep orientation commensurate with the instantaneous bearing of the radar search. The conventional radar PPI presentation is often referred to as a search mode of operation where the geometric center of the face of the cathode ray tube or reference point represents either the point in time which the radar pulse was transmitted in ground radar apparatus or a point in time following the transmission of the radar pulse including the time required for electromagnetic energy to reach and return from the ground directly beneath the aircraft in which airborne radar is mounted.

This completely conventional PPI presentation from a radar is satisfactory for many applications. However, there are instances when it is desirable to take a portion of the radar presentation appearing on the face of the cathode ray tube and expand it to cover the entire face of the tube in a manner so that it appears that the origin of the sweep of an electron beam across the face of the tube is offset. The apparent starting time or origin of the saw-tooth may be off from the center of the PPI by a distance which is equal to several times its radii. This is often referred to as an expanded or offset presentation. This mode of operation and radar presentation is often used for tracking of navigational reference points and bombing targets. During this latter mode of operation, it is important that the target or navigational reference point be displayed at the geometric center of the face of the cathode ray display (PPI). Because the target or navigational point will be displayed at the center of the PPI presentation, it is important that this portion of the display be as accurate as possible.

In assuring that the center of the PPI presentation represents either the time of transmitting the interrogating pulses of the radar (plus the time for the transmission of the pulse to ground and return depending upon altitude for airborne radar installations) during the search mode or represents the navigational point (or bombing target during the tracking mode), one of the problems lies in the provision of a direct current electrical component of an appropriate magnitude in the deflection means at the precise time of interest.

If alternating current coupling is utilized in either the horizontal or vertical sweep channels, such a constant direct current electrical component is not available inasmuch as the average amplitude over a cycle is required to be zero. Further, if direct coupling of the components in either one of the channels is attempted, many design problems accrue. Such design problems have been found to be more critical in transistor embodiments than in vacuum tube embodiments. One technique for avoiding this problem is to alternating current couple the components in each channel from the clamping circuits to the appropriate deflection means and then provide a separate direct current path to the drive amplifier of the deflection means in each of the channels. When using this technique, it is necessary that the direct current electrical component provided by the separate path be variable in accordance with the direct current component shift taking place for each successive sweep voltage waveform. Thus, it is required that means be provided to detect the existing direct current component for each sweep waveform for the precise time of interest, followed by an appropriate correction of that quantity when necessary, so that no distortion appears in the voltage waveform as a result. According to the present invention, such a function may be provided by an electronic digital sampled-data control system having many novel features, as will be set forth.

It is, therefore, a primary object of the present invention to provide a new and improved electronic sampled-data control system.

It is another object of the present invention to provide a new and improved digital electronic sampled-data control system with a high order of accuracy.

It is still another object of the present invention to provide a new and improved electronic sampled-data control system which samples at one point in time and corrects at another point in time by digital integration.

It is a further object of the present invention to provide a new and improved electronic sampled-data control system which samples an electrical component at a first controlled point in time for comparison with a reference quantity, digitally stores the error quantity for a controlled time period, and digitally integrates the successive error quantity in accordance with its polarity while correcting the sampled electrical component at a second controlled point in time.

It is an additional object of the present invention to provide a new and improved electronic sampled-data control system for sampling the instantaneous electrical component in a radar deflection circuit at a controlled point in time along the electrical sweep waveform for comparison with a reference quantity and for correcting any error in the sampled sweep waveform during the sweep recovery time.

Other objects of the invention will be pointed out in the following description and claims and illustrated in the accompanying drawings which disclose, by way of examples, the principle of the invention and the best mode which has been contemplated of applying the principle.

In the drawings:

FIG. 2a shows exemplary electrical waveforms of the sweep circuit of one channel of a radar display system when only alternating current coupling is utilized.

FIG. 2b shows electrical waveforms for the searching and tracking modes which will be helpful in understanding the disclosed practical embodiment of the sampled-data control system according to the present invention;

FIG. 4 shows an exemplary detailed electrical circuit of the differential amplifier 32 of FIG. 3;

FIG. 5 shows an exemplary detailed electrical circuit for the electronic switch 40 of FIG. 3;

FIG. 6b shows a step load line useful in understanding the operation of the multistable counter circuit shown in FIG. 6a;

FIG. 7 shows an exemplary detailed electrical circuit for differential amplifier 57 of FIG. 3; and FIG. 8 shows a simplified electrical schematic of an exemplary accumulator and a digital analog converter, which may be utilized in practicing the present invention.

Identical components shown in more than one of the figures will have identical reference numerals.

Figure 1:
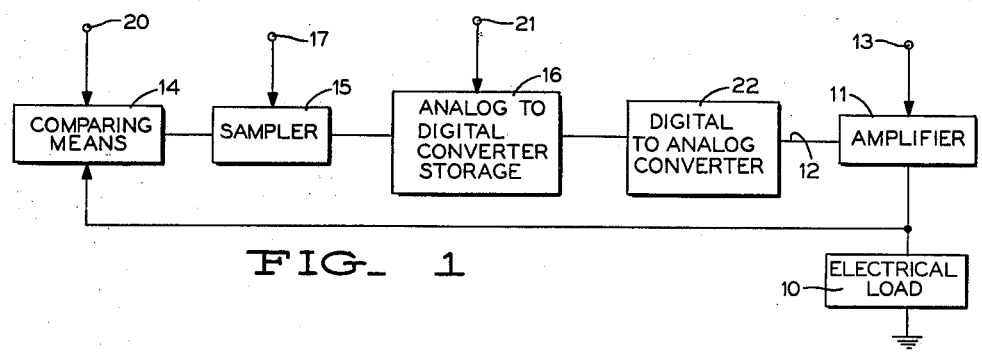
FIG. 1 shows a block diagram of an error sampled-data control system according to the present invention.

Referring to FIG. 1, the present invention may be briefly described as a means for maintaining a known direct current electrical component in electrical load 10 which is shown as being energized by amplifier 11. Amplifier 11 has a direct current coupled input 12 and, in addition, may also have a separate alternating current coupled input 13. By continuously comparing the direct current electrical component of electrical load 10 with a reference voltage applied to a terminal 20 of comparing means 14, an analog error voltage is obtained. This error voltage is then applied to sampler 15 which operates at particular sampling times determined by the occurrence of pulses from the source applied to terminal 17. This sampler converts the instantaneous error voltage to an analog sampled error pulse of a constant width having a magnitude and polarity determined by the instantaneous difference between the direct current electrical component in the electrical load 10 and the reference voltage. The sampled error voltage pulse is then converted and stored as a digital quantity by a converter 16. After a time delay and a selected readout time determined by source 21, the digital error signal is integrated and converted to an analog voltage by means 22 for instantaneously altering the direct current coupled electrical input 12 to amplifier 11 as an integral of the sampled voltage error pulse. Thus, the time period between each sampling time and corresponding readout time is commensurate with the controlled time delay of the electronic sampled-data control system.

Although the teachings of the present invention pertain to a sampled-data control system which has general utility, a specific embodiment is illustrated herein for providing a discrete position referencing means usable for applying electrical saw-tooth waveforms to deflection circuitry in plan position indicator (PPI) type radar displays. Referring to FIG. 1, electrical load 10 might well comprise the deflection circuitry for one co-ordinate of the aforementioned radar display. As indicated hereinabove, in designing a PPI radar display, it is desirable that the components in the vertical and horizontal channels be alternating current coupled from the clamping stage to power amplifier 11 via input terminal 13 in order to pass the alternating current electrical waveform. A separate direct current coupled path is used to apply the desired direct current electrical component to power amplifier 11 via input terminal 12.

Referring now to FIG. 2a, there is shown an exemplary amplitude versus time waveform of the alternating current output of either the horizontal or vertical windings of the aforementioned resolver. If alternating current couplings were utilized between one of the resolver windings and its corresponding deflection circuit, the electrical waveform in the deflection circuit would have the characteristic shown in FIG. 2a, because an alternating signal without a direct current component must have an average amplitude of zero. As may be seen by inspection, the voltage level at which successive saw-tooth waveforms commence varies in time. Since such a variation causes distortion in the display means, it is highly desirable that a direct current electrical reference be provided. As illustrated in FIG. 2a, the correction required for each saw-tooth waveform will vary from one saw-tooth waveform to the next. Moreover, when utilizing the PPI cathode ray tube displays described herein, it is particularly desirable that the saw-tooth waveform have a correct direct current electrical component when it instantaneously corresponds to the origin or geometric center of the display. This is true whether the PPI presentation is in either its search mode or its tracking mode.

FIG. 2b shows two saw-tooth waveforms for illustrating the control which it is desired that the new and improved sampled-data control system exercise during the searching and tracking modes. Therein, $T_s$ represents the system trigger pulse which corresponds in time with the beginning of each sweep period, and $T_r$ represents the initiation of the sweep recovery period. $T_{x_1}$ represents the instant at which the sweep amplitude is to be controlled during the search mode. This corresponds with the time at which the radar transmits the interrogating pulses plus the time required for the transmission of the pulse to ground and return, depending on the altitude for airborne installations. $T_{x_2}$ represents the instant at which the sweep amplitude is to be controlled during the tracking mode of operation. This corresponds to the navigational point or bombing target during the tracking mode. Stated another way, $T_{x_1}$ represents the point in time on the saw-tooth electrical waveform which should be maintained at a direct current electrical component magnitude corresponding to the geometric center of the cathode ray tube display during the searching mode. $T_{x_2}$ represents the point in time on the saw-tooth electrical waveform which should be maintained at a direct current electrical component magnitude such that it will correspond to an arc passing through the geometric center of the cathode ray tube display during the tracking mode. During the tracking mode of presentation, only an amplified section of the normal PPI presentation is displayed and $Tx_1$ moves from the geometric center to one side of the PPI display or off the PPI display entirely in accordance with the range of the target being displayed at the geometric center.

If a reference direct current electrical component is scaled equal to the electrical level in the deflection circuit corresponding to the geometric center of the cathode ray tube display, the instantaneous magnitude of the electrical waveform at the particular point in time of interest may be compared with the reference quantity to detect the magnitude and direction of any error. During the search mode of operation, the point in time of interest is $Tx_1$ inasmuch as $Tx_1$ should correspond with the geometric center. During the tracking mode of operation, the point in time of interest is $Tx_2$, inasmuch as $Tx_2$ should correspond with an arc passing through the geometric center of the PPI display. To minimize display distortions, any corrections made in accordance with the detected errors in either the searching or tracking modes should be delayed and made during the sweep recovery period following $Tr$. Furthermore, since $Tx_2$ is a variable depending on the distance that $Tx_1$ has moved from the presentation origin, the delay time $Td=(Tr-Tx_2)$ must be continuously variable. In summary, every error must be computed at time $Tx_1$ for the searching mode or $Tx_2$ for the tracking mode, stored until sweep recovery time $Tr$, and then made available to correct the direct current electrical component in the sweep circuit.

The rate at which the error sampling and correction may be made is dependent upon the particular application. In the radar display system being described, it is obviously a function of the sweep frequency rate. Likewise, the quantitative scaling of the error sampled control system is also dependent upon the particular application. For example, consider radar display being described as requiring that the selected point ($Tx_1$ or $Tx_2$) on the sawtooth electrical waveform be correctly positioned within $\frac{1}{1000}$ of the tube diameter. Then a unit error may be defined as either $\frac{1}{1000}$ of the tube diameter, or the voltage or current in the deflection circuit necessary to move the sweep trace $\frac{1}{1000}$ of the tube diameter. In radar displays, the sweep frequency selected will determine not only the error sampling rate desired but will also affect the number of unit errors by which the display will need to be corrected following each sample. A realistic unit error range for sweep frequencies of 200 to 1600 c.p.s. for a radar display system of the type described would be of approximately 4 unit errors per sweep in either direction.

According to the present invention, an analog error pulse is provided by sampling the instantaneous direct current electrical component in the electrical load or deflection circuit at either $Tx_1$ or $Tx_2$, whichever is to be maintained at the origin of the cathode ray tube display. This analog error pulse is then converted to digital form and stored as the most practical means of obtaining long and variable time delays. Thereafter, and at time $Tr$, this stored digital error is reconverted to analog information and integrated in the input 12 of amplifier 11, thereby correcting the sampled error. Although the introduction of analog-to-digital and digital-to-analog conversions results in considerable circuit complexity, it represents the best compromise in obtaining the flexible digital storage which is required. Moreover, there are several additional advantages to such a system. First, the digital-analog converter can provide the desired error integration for amplifier input 12. Finally, system accuracy may be more readily controlled when the error is available in digital form.

Figure 3:
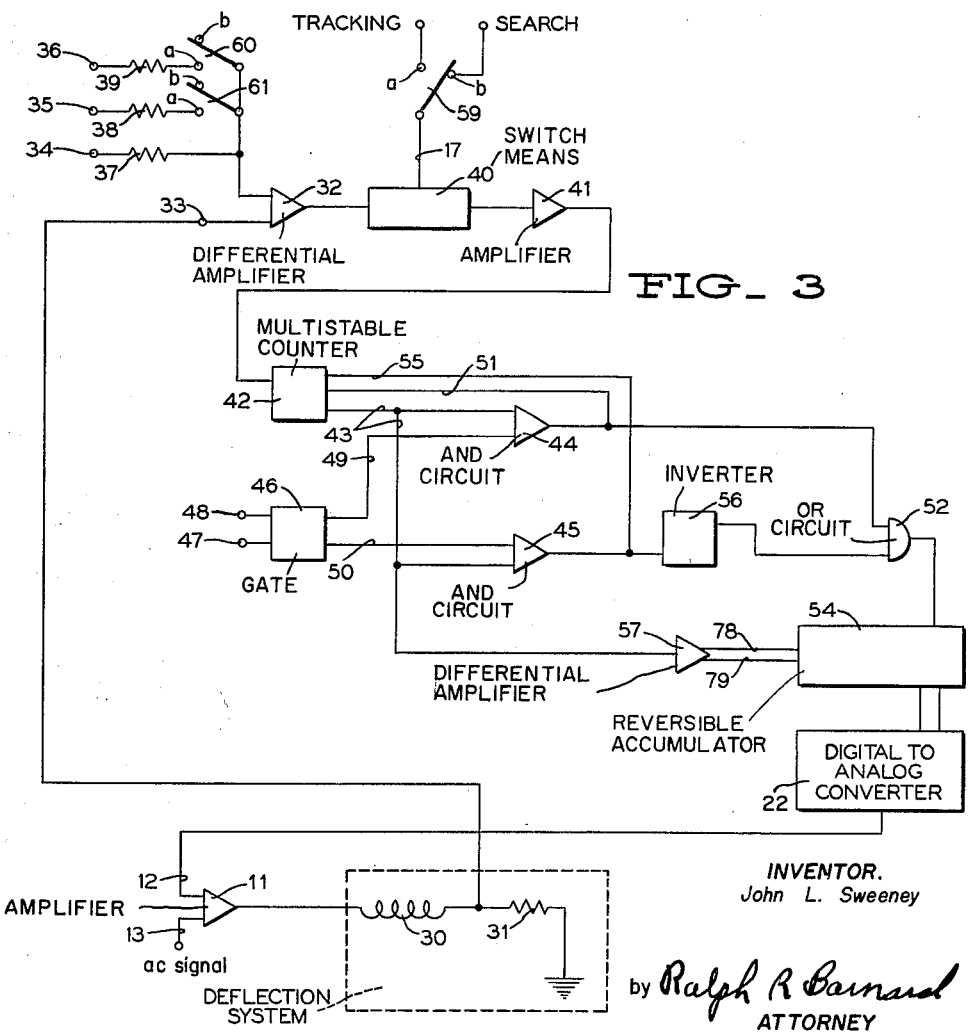
FIG. 3 shows a detailed block diagram of the error sampled-data control system of the present invention being applied to control the direct current coupled electrical level of the electrical waveform in one channel of a radar display system.

Referring now to FIG. 3, there is shown an electrical block diagram of a more detailed embodiment of the error sampled-data system according to the present invention. Switching means are also shown therein for modifying the sampled-data control system to either its searching or tracking modes. These switching means are shown in the searching mode positions. The deflection circuit is shown as deflection coil 30 which is driven by power amplifier 11. Amplifier 11 receives at input terminal 13 an electrical saw-tooth waveform from either the horizontal or vertical resolver channels (not shown) via a clamping circuit (not shown) through alternating current coupled components. The direct current electrical component magnitude therein is determined by the electrical input level at input terminal 12. Furthermore, the alternating current coupled input at terminal 13 is appropriately blanked out by means (not shown) whenever that portion of the instantaneous sawtooth waveform is not necessary for the desired display.

Deflection coil 30 is shown connected to ground via sampling resistor 31. The purpose of sample resistor 31 is to provide a voltage commensurate with the instantaneous electrical waveform in deflection coil 30 which may be fed back to differential amplifier 32 (comparing means 14 of FIG. 1) and compared with a reference voltage. Differential amplifier 32 receives the feedback voltage at input 33 and the reference voltage at terminal 34. The reference voltage applied to terminal 34 is selected in accordance with that magnitude which will maintain the point of interest on the electrical saw-tooth waveform commensurate with $Tx_1$ at the geometric center of the cathode ray tube display when the presentation system is in its searching mode. Terminal 34 is connected to the differential amplifier via summing resistor 37. Thus, during the searching mode, the output from differential amplifier 32 derives an analog output voltage instantaneously commensurate with the difference of the feedback voltage and the reference voltage. Although differential amplifier 32 may be of a conventional type, a particular circuit utilized satisfactorily for this purpose will be described in more detail hereinafter in connection with FIG. 4.

In order to sample the instantaneous electrical waveform in deflection coil 30 in comparison with the reference voltage being applied to terminal 34 when the instantaneous magnitude of the electrical waveform correspond to that point in time $Tx_1$, the output of differential amplifier 32 is directly coupled to electronic switch 40 (sampler 15 of FIG. 1) Switch 40 is closed instantaneously at time $Tx_1$ by a narrow timing pulse of constant width being applied to terminal 17 through single-pole double-throw mechanical switch 59 in the position shown. Since the reference voltage corresponds with the deflection level of the origin of the cathode ray tube display and the $Tx_1$ timing pulse represents that point on the electrical waveform which it is desired to coincide with the origin during the searching mode, the voltage pulse output of switch 40 represents the instantaneous analog error. The magnitude of the error analog voltage pulse represents the magnitude of the error at the sample time, and the polarity of the pulse represents the direction polarity of error and direction in which the direct current electrical component level must be corrected. The magnitude of the analog error pulse may be considered in terms of unit errors in accordance with the definition set forth above. An exemplary electronic switch for providing the functions set forth above will be described in more detail hereinafter in connection with FIG. 5. It should be understood, however, that many other conventional electronic switches are available.

The error sample output from electronic switch 40 is then amplified in conventional alternating current amplifier 41 and applied to an analog-to-digital converter and storage means shown as multistable counter 42. As indicated above, the normal sensitivity required for the error sampled-data control system, according to the present invention, when applied to the present radar display application, is to provide for a 4 unit error correction. Since the error may be of one polarity or the other, the multistable counter must be able to detect 9 different levels in the analog error sampled pulse of a constant pulse width. To perform this function, the multistable counter may contain an up and down circuit which has a zero reference direct current voltage output and four stable positions of direct current voltage output on either side of the reference. By way of example, a multistable counter which may perform such a function will be described hereinafter in connection with FIGS. 6a and 6b. However, it is emphasized that other analog-to-digital conversion and storage devices are available which will perform the desired function.

Following each error sampling, the multistable counter stores a digital count in the up or down direction in accordance with the magnitude and polarity of the analog error sampling, thereby digitally quantizing the error. Since the multistable counter is stable in any one of the nine positions, it remains in the state to which it is driven by the analog error sample and provides the memory required in securing the desired variable time delay operational feature. As will be recalled from the description set forth hereinabove, it is an important feature of the present error sampled-data control system to sample at a particular time, such as represented by $Tx_1$, and store this error to be later read out at the initiation of sweep recovery time $Tr$ for purposes of correction. Furthermore, when multistable counter 42 is read out, it is also essential that it be reset to its zero reference direct current voltage output level in order that it be prepared to receive the next analog error sampled voltage.

In order to provide this variable time delay by controlling the time for initiating the readout and the corresponding resetting of multistable counter 42, output 43 of the counter serves as one of the inputs to both a positive going AND circuit 44 and a negative going AND circuit 45. In addition to desiring that multistable counter 42 be read out only during the sweep recovery time, it is also important that the readout be in the form of discrete pulses, each corresponding to a unit error as defined hereinabove. In order to provide both of these functions, conventional gating circuit 46 is connected to receive two inputs via input terminals 47 and 48. Terminal 47 is connected to receive a wide positive going pulse having a width which coincides with the sweep recovery time of the radar display. Such a pulse is a conventional radar display input and will normally be available via a pulse source (not shown). Gate 46 is also connected to receive successive unit error marker pulses via terminal 48. Such pulses will conventionally be available in radar display systems as they are normally utilized as range markers. The selection of the range markers should be based on the definition of unit error as set forth above. Operating in a conventional manner, gate 46 may be connected such that positive going unit error markers will appear at output terminal 49, and negative going unit error markers will appear at output terminal 50 each time both of the inputs to terminals 48 and 47 are positive. Thus, gate 46 produces positive and negative going unit error markers only during the sweep recovery time commencing at $Tr$. As shown, the output terminal 49 of gate 46 is connected to provide a positive going pulse input to AND circuit 44 and output terminal 50, and gate 46 is connected to provide a negative going unit error pulse to AND circuit 45.

In order to understand the operation of FIG. 3, assume that multistable counter 42 converts the analog error sampled voltage to digital information a time $Tx_1$ by counting up to one of its four stable positions on the plus side of a zero direct current reference voltage level with the voltage level of its output terminal 43 increasing proportionately. Accordingly, each time AND circuit 44 receives a positive going error pulse from gate 46 during sweep recovery time in coincidence with its positive voltage level input from multistable counter 42, a unit error pulse is produced in its output. The number of unit error pulses produced in the output of AND circuit 44 is a measure of the error voltage that was stored in the multistable counter 42 at sampling time $Tx_1$. Since AND circuit 45 is not receiving a negative voltage input from counter 42, no unit error pulses pass therethrough. The unit error pulse appearing at the output of AND circuit 44, representing the digital error sampling, is then fed to OR circuit 52 and reversible accumulator 54 for integration and reconversion to a commensurate analog quantity in a manner which will be described in detail hereinbelow. Furthermore, in order that multistable counter 42 be placed in condition for receiving the next error sampling during the next error sampling period, counter 42 is reset via terminal 55 by one unit error each time a unit error pulse is transmitted to reversible digital accumulator 54.

On the other hand, assume that multistable counter 42 converts the error sampled voltage to digital information at sample time $Tx_1$ by counting up to one of its four stable positions on the negative side of the zero direct current reference voltage level with the voltage level of its output terminal 43 increasing proportionately. Thereupon, each time AND circuit 45 receives a negative going unit error pulse from gate 46 during sweep recovery time in coincidence with its positive voltage level input from multistable counter 42, a unit error pulse is produced in its output. These unit error pulses, representing the digital error sampling, are then fed through inverter 56 and OR circuit 52 to reversible digital accumulator 54 for integration and reconversion to a commensurate analog quantity in a manner which will be described in detail hereinbelow. Furthermore, in order that multistable counter 42 be placed in condition for receiving the next error sample during the next sampling period, counter 42 is reset via terminal 51 by one unit error each time a unit error pulse is transmitted to reversible digital accumulator 54. Since AND circuit 45 is not receiving a positive voltage input from counter 42, no unit error pulses pass therethrough.

Since the input to reversible digital accumulator 54 is provided by positive going pulses for each readout regardless of the polarity of the digital information stored in multistable counter 42, further means must be provided to assure that the reversible digital accumulator 54 is counting in the proper direction. Accordingly, differential amplifier 57 is also connected to the output of multistable counter 42 to monitor the polarity of the output voltage appearing at terminal 43 for operating the UP and DOWN gates of reversible digital accumulator 54 in accordance with whether the digital error sample is of one polarity or the other. Reversible digital accumulator 54 will be described in considerable detail hereinafter in connection with FIG. 8.

As a result, the digital number stored in reversible digital accumulator 54 is modified in either the count up or count down direction for each error sampling and readout of counter 42, thereby maintaining a digital count which is the integral of the unit errors sampled. Recalling the over-all operation of the error sampling system, this accumulated error represents the desired direct current electrical component for deflection coil 30 in digital form. Because the input of power amplifier 11 via terminal 12 requires an analog voltage, further digital-to-analog conversion means 22 is shown responsive to reversible digital accumulator 54 for applying a voltage to terminal 12. By way of example, digital-to-analog conversion means 22 may be of the ladder decoder type which will be described in more detail hereinafter in connection with FIG. 8.

When it is desired to switch the error sampled control system of the present invention, as applied to a radar PPI display and described above in conection with FIG. 3, from the searching mode to the tracking mode, switches 59, 60 and 61 are switched from the positions shown in FIG. 3, thereby closing contacts 59a, 60a and 61a. As a result, differential amplifier 32 receives a voltage commensurate with the unresolved electrical saw-tooth sweep voltage from a sawtooth electrical waveform generator (not shown) via terminal 36, resistor 39 and through closed relay contact 60a. Differential amplifier 32 also receives a voltage in opposition to the voltage appearing at terminal 36 commensurate with the instantaneous resolved vertical saw-tooth waveform from the clamping stage in the vertical channel (not shown) via terminal 35 and summing resistor 38. During this mode of operation, electronic switch 40 is actuated by a timing pulse comensurate with $Tx_2$, as defined above, through closed relay contact 59a such that the target or navigational point is maintained at the geometric center of the cathode ray display under the cross hairs regardless of how far the point on each sweep waveform commensulate with $Tx_1$ has moved from the center of the display. The above described correction must be made to the input of differential amplifier 32 in order that the slant range marker pass through the geometrical center of the display.

Referring to FIG. 4, there is shown an exemplary differential amplifier which may be utilized for differential amplifier 32 of FIG. 3. Therein, two NPN transistors T1 and T2 are shown. Each is utilized in the common emitter configuration and connected in parallel with one another. The common emitters are connected to a constant curent source comprising NPN transistor T3 with resistor 62 connecting the emitter to a −bias voltage, $Ve$, and the base connected to a −bias voltage, $Vb$. A constant current is maintained in the collector of T3 as a result of the modification of its biasing each time the collector-to-emitter current is altered. The collectors of transistors T1 and T2 are each connected to a +bias voltage, $Vcc$, through identical resistors 63 and 64, respectively. A reference voltage is derived in a manner described hereinabove in detail in connection with FIG. 3 (during either the searching or tracking mode) and applied across summing resistor 65 to the base of transistor T1. At the same time, the base of transistor T2 may be connected to terminal 33 for receiving a feedback voltage across summing resistor 66 commensurate with the continuous sample taken of the electrical waveform in deflection coil 30 (FIG. 3).

As long as the voltage being applied to the base of transistor T1 is the same as the voltage being applied to the base of transistor T2, the two transistors conduct equally, and the collector voltage of transistor T3 approaches the emitter voltage which is very close to zero. However, if the voltage applied to the base of transistor T1 exceeds the voltage being applied to the base of transistor T2, the collector-to-emitter current of transistor T1 will exceed that of transistor T2 by an amount commensurate with the aforementioned base voltage differential and vice versa. This is primarily based on the fact that transistor T3 is operating as a constant current source, and an increase in the collector and emitter current at one of the transistors must result in a decrease in the collector and emitter current of the other transistor. As a result of the decrease of current, the voltage of the collector of transistor T2 will increase its voltage level toward the +D.C. bias. In contrast, when the voltage being applied to the base of transistor T2 is more positive than the voltage being applied to the base of transistor T1, the voltage of the collector of T2 will decrease away from the +supply voltage. The output terminal of the differential amplifier is the collector of T2.

Referring now to FIG. 5, there is shown an exemplary embodiment of the electronic switch of FIG. 3. Therein, two PNP transistors T4 and T5 are shown connected in series with one another and in a common base configuration. The emitter of transistor T4 is connected to receive the continuous differential amplifier voltage level output via terminal 74. The bases of transistors T4 and T5 are connected together through identical biasing resistors 68 and 69, while the collectors of transistors T4 and T5 are commoned and connected through the secondary of a pulse transformer 72 to the common junction of resistors 68 and 69. The emitter of transistor T5 provides the output to conventional amplifier 41. As connected, the collector and base of each of the transistors T4 and T5 are at the same bias, and, as a result, these transistors are in their non-conducting state, except for leakage current. In order to provide a reference level in the output of the switch, the emitter of transistor T5 is shown biased by a voltage divider comprising resistors 70 and 71 which are energized by the +power supply. When a positive pulse is supplied between the collector and base of each of these two transistors by a pulse transformer 72 through timing pulse switch 59, both transistors T4 and T5 commence to conduct, and a pulse is generated in the output terminal 73 in accordance with a magnitude and polarity commensurate with the voltage level being applied to input terminal 74. The width of the pulse appearing at the output of terminal 73 is determined by the pulse width being applied to transformer 72 through timing pulse switch 59. In some cases it may be desirable to use pulse shaping circuitry to assure that the shape of the pulse being applied to transformer 72 is as narrow and as constant as desired. In applying the present invention to radar display control applications, a timing pulse width of approximately one microsecond has been utilized. While the electronic switch of FIG. 5 has been described in detail, many other transistorized series switches would be satisfactory, depending upon the particular practical application being made in the present invention.

Figure 6A:
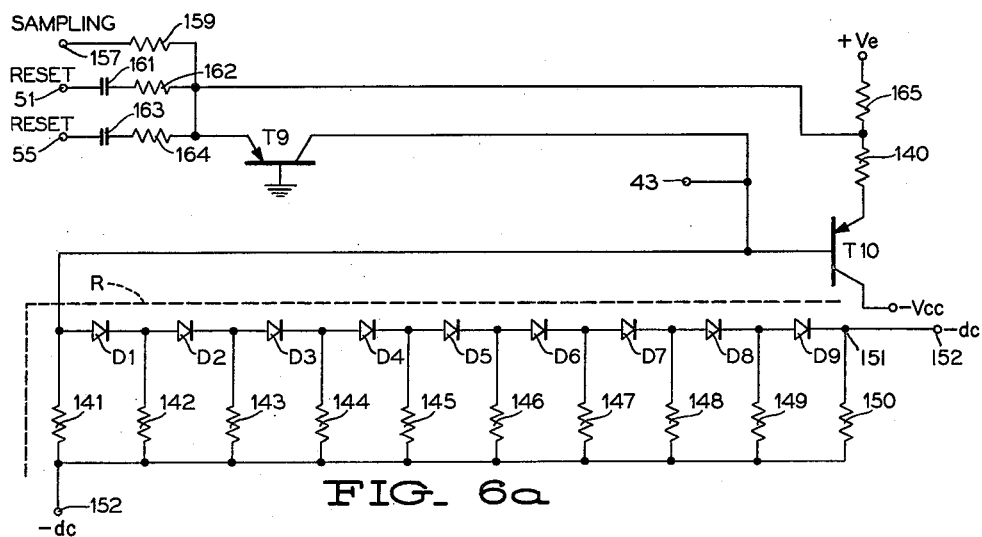
FIG. 6a shows an exemplary detailed electrical circuit of the multistable counter 42 of FIG. 3.

Referring to FIG. 6a, there is shown an exemplary multistable counter which may be utilized as counter 42 of FIG. 3. The fundamental theory of this type of multistable counter is set forth in copending application No. 479,413, filed January 3, 1955, now U.S. Patent No. 2,903,604, by Robert A. Henle. Basically, the counter of FIG. 6a comprises two PNP type transistors T9 and T10 connected in a positive feedback arrangement. Transistor T9 is shown in the grounded base configuration with its collector connected to the base of T10. The collector of T10 is connected directly to −bias voltage $Vcc$, while its emitter is connected to a +bias voltage $Ve$ through a series connection of resistors 140 and 165. To provide the feedback connection, the common junction of resistors 140 and 165 is connected to the emitter of T9. A load resistance, generally identified as R and set off in a dotted block, is connected to the collector of T9.

According to the basic theory of operation of the counter, the feedback arrangement of T9 and T10 is stable when the total resistance R is less than that of resistor 140 and unstable when the total resistance R is greater than that of resistor 140. By designing resistance R to have alternately small or large resistance values in accordance with the voltage appearing at the collector of T9, a multistable device is obtained. Such a resistance is depicted by the load line shown in FIG. 6b.

Therein, $Vc$ and $Ic$ may be considered to represent the collector voltage and the collector current of T9. The collector voltages and currents of T9 which correspond to high gain and unstable operation will intersect the step load somewhere along the flat portions, while the collector voltages and currents which correspond to low gain and stable operation will intersect the step load line somewhere along the more vertical portions. When T9 is driven into an unstable portion of the load line, its operating point will continue to shift to the next stable position of current and voltage.

An exemplary load resistor R is illustrated as comprising a ladder network of zener diodes D1, D2, D3, D4, D5, D6, D7, D8 and D9 in a series parallel relationship with identical resistors 141–150, as shown. In addition, the ladder network is energized at terminal 151 by a more negative voltage than that being applied at terminal 152.

Figure 6B:
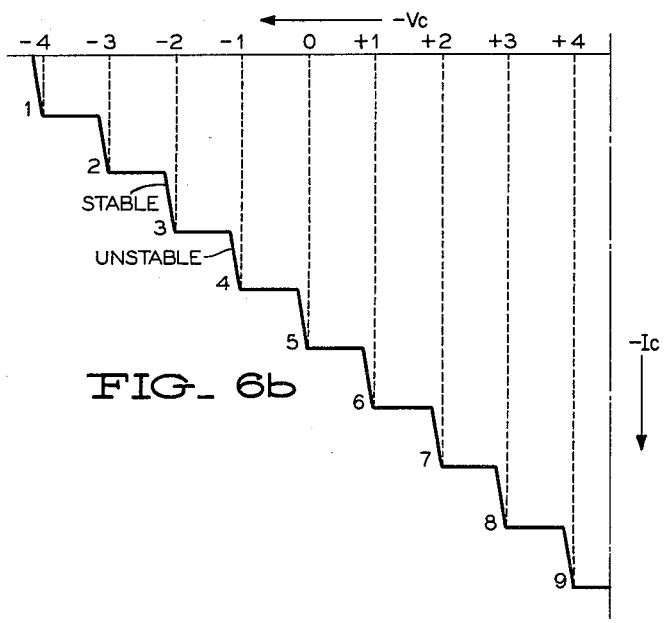

The magnitude of the difference of the voltages being applied to the terminals and the zener diodes should be selected so that all of the diodes can be operated in the zener region at any one time. Referring to FIG. 6b, it is desired that this condition exist when the voltage level of the collector of T9 corresponds of −4 unit errors. During this condition, all of the zener diodes act in series to present a resistance R which is lower than the impedance resistance of resistor 140. As indicated, this is a stable condition for the counter.

If the conducting condition of T9 is then modified toward a condition corresponding to −3 unit errors, the voltage level of the collector of T9 will be modified in the positive direction, as shown in FIG. 6b. The voltage drop across diode D1 will then decrease in a manner such that it will no longer remain in its zener region and will momentarily act as an open circuit. As a result, the resistance R will become equal to the resistance of resistor 141 which was selected as being greater than the resistance of resistor 140. Since such a condition results in instability, the collector voltage of T9 continues to go more positive until diode D1 conducts in the forward direction as a result of being forwardly biased. The resistance R then becomes equal to a series connection of diodes D1–D9 (D1 conducting in the forward direction and D2–D9 conducting in the reverse direction). The operating condition of T9 and T10 then corresponds to the −3 unit error operating point shown in FIG. 6b.

Based on similar reasoning, when the collector of T9 is driven to its operating point corresponding to zero unit errors, shown in FIG. 6b, diodes D1–D5 conduct in the forward direction as a result of being forwardly biased, while diodes D6–D9 are reversely biased for zener conduction. This condition represents the normal operating point when no unit errors are stored in the counter as a result of maintaining the collector of T9 at a particular voltage in the absence of other input signals. Another input terminal 157 is connected to the emitter of T9 through resistor 159 for modifying the operating point of transistor T9 in accordance with the number of unit errors contained in the analog sampling pulse at each sampling time. In order to provide for the resetting of the counter, positive reset pulses are applied to the emitter of T9 via terminal 51, capacitor 161 and resistor 162; and negative reset pulses are applied to the emitter of T9 via terminal 55, capacitor 163 and resistor 164. As described hereinabove, these reset pulses modify the operating point of T9 by one unit error. As indicated in FIG. 6a, the operating point of transistor T9 and the counter is determined by the voltage level of its collector. Therefore, output terminal 43 is shown connected thereto. A capacitor is included in each of the sampling and positive and negative inputs to prevent each of these inputs from affecting the other.

If, at sampling time, the constant width analog voltage is derived at input terminal 157 commensurate with +3 unit errors, the operating point of T9 would be changed from a voltage corresponding to zero unit errors through several unstable and stable conditions to a voltage corresponding to +3 unit errors in a manner similar to that described above. When T9 has reached its new operating point, diodes D1–D8 will conduct in their forward condition as a result of forward biasing, and D9 will remain in zener conduction as a result of reverse biasing. Following a time delay in accordance with the point in time that it is desired to read out the unit errors stored in this multistable counter via terminal 43, appropriate reset pulses are applied to the input of T9 to step its operating point back to the condition corresponding to zero unit errors. Although zener diodes have been utilized herein to provide the step load line in FIG. 6b, other means are available to perform this function. For an illustration of other means, reference is made to the above identified copending application.

Referring now to FIG. 7, there is shown an exemplary differential amplifier which may be utilized for differential 57 of FIG. 3. Therein, there are shown two PNP transistors T6 and T7 connected in the common emitter configuration and in parallel with one another. The common emitters are in turn connected to a constant current source comprising PNP transistor T8 with resistor 132 connecting the emitter of T8 to a −bias voltage Ve. The base of T8 is also connected to a −bias voltage Vb. The collectors of T6 and T7 are each connected to a +bias voltage Vcc through identical resistors 135 and 136, respectively. As described thus far, the present differential amplifier is identical with the differential amplifier described in detail hereinabove in FIG. 4. However, it should be noted that the base of T6 is grounded through resistor 137 to provide a constant reference voltage rather than a variable voltage, while the base of T7 is connected to receive the stored unit error voltage from output terminal 43 of multistable counter 42 through a voltage divider comprising resistors 133 and 134. Two output terminals 78 and 79 are provided at the collectors of T6 and T7, respectively. If the voltage applied to the base of T7 is the same as the reference voltage being applied to T6, each of these transistors are designed to conduct equally, with the collector voltage of T8 approaching its emitter voltage which is very close to zero. As utilized in FIG. 3, the differential amplifier is connected to receive a voltage via terminal 43 from multistable counter 42 commensurate with the error sample stored therein in digital form. This digital error sample may be of a magnitude with a range of ±4. When this digital error sample is zero, the current in T6 and T7 is equal, with the result that the voltage level at output terminals 78 and 79 is very close to zero. However, if, by way of example, a voltage commensurate with one or more +unit errors is applied to the base of T7 via terminal 43, the collector and emitter current of T6 will exceed that of T7 by an amount commensurate with the voltage differential between their respective bases. This is primarily based on the fact that T8 is operating as a constant current source, and an increase in the collector and emitter current in one of the transistors must result in a decrease in the collector and emitter current of the other transistor. Therefore, the voltage level of the collector of T7 will increase toward +Vcc. On the other hand and following the same reasoning, when the voltage applied to the base of T7 via terminal 43 is commensurate with one or more −unit errors, the collector and emitter currents of T7 will exceed that of T6 by an amount commensurate with the −unit errors in the error sample. Therefore, the voltage of the collector of T6 will increase toward +Vcc. As will be described hereinbelow, the voltage levels at terminals 78 and 79 determine whether the reversible accumulator 54 in FIG. 3 will count up or down.

Referring now to FIG. 8, there is shown a comparatively detailed block diagram of reversible digital accumulator 54 and the ladder digital-to-analog decoder 22 of FIG. 3. Therein, ten triggers, 80 through 89 (each representing increasing orders of significance of binary numbers), are shown electrically cascaded in series through plural UP gates 90 and plural DOWN gates 91 for serially counting the negative pulse being applied to input terminal 92 from OR circuit 52 of FIG. 3. As described hereinabove, these serial negative pulses are commensurate with each unit error in the electrical level of the electrical waveform in deflection coil 30 at the selected sampling time. The direction or polarity of these unit errors is represented by the state of the plus and minus sides of differential amplifier 57 (FIG. 3) and applied to terminals 93 and 94 for simultaneous application to gates 91 and 90, respectively. Because one output terminal of differential amplifier 57 will always be at an UP level when the other output terminal is at a DOWN level and vice versa, the input voltage levels to the terminals are shown out of phase. Triggers 80 through 89 may be of a conventional construction, as exemplified by a transistorized trigger shown in FIGS. 18–31, page 595, in a textbook entitled Pulse and Digital Circuits, by Millman et al., and published by McGraw-Hill. Plural UP gates 90 and plural DOWN gates 91 may be of a conventional design which will pass negative going voltage level changes to their output when the control input is receiving a DOWN level input voltage level. Such a conventional construction may be exemplified by a transistorized gating circuit shown in FIGS. 14–10, page 436, in the textbook entitled, Pulse and Digital Circuits, further identified above.

Conventionally, a trigger is OFF when its right output terminal is at a DOWN level and ON when its right output terminal is at an UP level. Moreover, when the right output terminal is at its DOWN level, the trigger will inherently have an UP level on its left output terminal and vice versa. Connected to the right output terminal of each of the triggers 80 through 89 is an input of an appropriate order of significance to a ladder decoder, which will be described in detail hereinafter. On the basis of the operation of that decoder, however, it is sufficient to state that each trigger transmits a "0" to its corresponding input of the decoder when it is OFF (right output terminal is down) and a "1" to the decoder when it is ON (right output terminal is up). Moreover, it will be noted that the right output terminal of each trigger (with the exception of trigger 89) will transmit a negative going pulse to the next trigger of a higher order of significance each time the right output terminal goes from an UP level to a DOWN level, and the corresponding UP gate 90 is at a DOWN level, causing the stored binary count in the triggers to increase. Likewise, a negative going pulse will be transmitted to the next trigger each time the left output terminal of each trigger (with the exception of trigger 89) goes from a high level to a low level, and the corresponding DOWN gate 91 is at a DOWN level, causing the stored binary count to decrease.

By way of example, suppose all of the ten triggers, 80 through 89, giving the reversible accumulator a storage capacity of 1024 pulses, are initially OFF. The decoder will receive a binary coded parallel input with an increasing order of significance of 0000000000. Further, consider that after the first error sampling the error delayed until sweep recovery is commensurate with five unit errors in the UP or positive direction. Terminal 94 will have a low level of voltage applied thereto by differential amplifier 54, and all of the UP gates 90 will open. Under these conditions, each trigger (with the exception of trigger 80) receives a negative going pulse from the adjacent next lower order trigger each time its right output terminal changes from a high to a low level. The first unit error pulse will turn trigger 80 from OFF to ON, representing a binary code of 1000000000. There will be no carry from trigger 80 to trigger 81 through the corresponding UP gate 90, because the right output terminal of trigger 80 went from a low level to a high level of voltage instead of vice versa. The second unit error pulse will turn trigger 80 OFF and transmit a negative going carry pulse to turn trigger 80 ON through the corresponding open UP gate 90, inasmuch as the right output terminal from trigger 80 went from an UP level to a DOWN level of voltage, thereby representing a binary code of 0100000000. The second of the third unit error pulse will turn trigger 80 ON without disturbing the other triggers, thereby representing a binary code of 1100000000. There will be no carry from trigger 80 to trigger 81 through corresponding UP gate 90, because the right output terminal of trigger 80 went from a low level to a high level of voltage instead of vice versa. The fourth unit error pulse will turn trigger 80 OFF and transmit a negative going carry pulse to turn trigger 81 OFF through the corresponding UP gate 90, inasmuch as the right output terminal of trigger 80 went from an UP level to a DOWN level of voltage. In addition, since the right output terminal of trigger 81 changes from a high to a low voltage level, the negative going carry pulse will be transmitted through corresponding open UP gate 90 so as to turn trigger 82 from OFF to ON. Thus, the OFF and ON condition of the triggers represents a binary code of 0010000000. The fifth unit error pulse will then turn trigger 80 ON but will not transmit any carry pulse to trigger 81, because the right side of trigger 80 will go from a low level to a high level voltage instead of vice versa. As a result, the triggers will represent a binary code of 1010000000. Thus, the five unit error determined by a particular error sampling is accumulated in the reversible counter 54 which is composed of triggers 80 through 89.

If, at the next error sampling, a "1" unit error is measured and read into the reversible accumulator as a negative going pulse via input terminal 92, the operation of the triggers in relation to one another will be modified because the error is in the DOWN or negative direction. As a result, differential amplifier 57 will reverse the levels being applied to terminals 78 and 79, thereby closing plural UP gates 90 and opening plural DOWN gates 91. As a result, the unit error represented by the negative going pulse applied to input terminal 92 of reversible accumulator 54 will turn trigger 80 OFF, thereby representing a binary code of 0010000000. There will be no carry pulse from trigger 80 and trigger 81 from corresponding DOWN gate 91, because the lefthand terminal of trigger 80 went from a low level to a high level voltage instead of vice versa. Accordingly, reversible accumulator 54, as described thus far, can be utilized to accumulate a binary coded number commensurate with the net unit errors for a large number of error sampling cycles. The operation of the triggers in relation to one another in providing a count UP and count DOWN, as desired, will be obvious from exemplary operation thus far described. It will be recalled that the unit error, as defined above and represented by each pulse applied to input terminal 92, approximately represents $\frac{1}{1000}$ of the diameter of the plan position indicator display.

Therefore, as a practical matter, it is desirable that reversible accumulator 54 be initially preset to have a count of about 511, representing a binary code of 1111111110. Thus, the reversible accumulator will be storing a unit error which is approximately near the center of the radar display.

As indicated above, the ON or OFF condition of the triggers 80 through 89 represents either a "1" or a "0" for a stored binary number in an increasing order of significance. Since this stored binary number represents the voltage level which it is desired to direct current couple to terminal 12 of driver amplifier 11 (FIG. 3), the ladder decoder shown connected to the right output terminal of each trigger is designed to detect the existance of a "1" in each trigger (the ON condition), thereby providing a corresponding analog voltage level that may be derived in summing resistor 100. In order to provide a known voltage level at terminal 12 across summing resistor 100 when each of the triggers 80 through 89 are OFF so that the reversible accumulator represents a binary number of 0000000000, terminal 12 is connected to a —D.C. voltage through resistor 101. The selection of a negative supply voltage determines that the known voltage will be negative, while the ratio of resistor 101 to resistor 100 will determine its magnitude. To provide additional voltages to modify the known voltage developed at terminal 12 by the —D.C. voltage, a +D.C. voltage is connected thereto via a parallel path for each significant order, represented by one of the triggers 80 through 89 These parallel paths comprise constant current generators and consist of the following: resistor 102 and diode 103 for trigger 89, resistor 104 and diode 105 for trigger 88, resistor 106 and diode 107 for trigger 87, resistor 108 and diode 109 for trigger 86, resistor 110 and diode 111 for trigger 85, resistor 112 and diode 113 for trigger 84, resistor 114 and diode 115 for trigger 83, resistor 116 and diode 117 for trigger 82, resistor 118 and diode 119 for trigger 81, and resistor 120 and diode 121 for trigger 80. Resistors 102, 104, 106, 108, 110, 112, 114, 116, 118 and 120 have comparative binary-to-decimal scaling resistance values equal to 1, 2, 4, 8, 16, 32, 64, 128, 256 and 512, respectively. Each of these parallel paths may act as a current source which will add an incremental voltage to the known reference voltage level at terminal 12. As will be apparent this provision of incremental voltage to the known reference voltage level at terminal 12 must be selective according to the ON-OFF condition of each trigger, and the amounts of the incremental voltages must be in proportion with the binary weighing of the trigger to which it is related.

In order to provide the necessary selectivity, the right output terminal of trigger 80 is connected to the junction of resistor 120 and diode 121 through diode 122, the right output terminal of trigger 81 is connected to the junction of resistor 118 and diode 119 through diode 123, the right output terminal of trigger 82 is connected to the junction of resistor 116 and diode 117 through diode 124, the right output terminal of trigger 83 is connected to the junction of resistor 114 and diode 115 through diode 125, the right output terminal of trigger 84 is connected to the junction of resistor 112 and diode 113 through diode 126, the right output terminal of trigger 85 is connected to the junction of resistor 110 and diode 111 through diode 127, the right output terminal of trigger 86 is connected to the junction of resistor 108 and diode 109 through diode 128, the right output terminal of trigger 87 is connected to the junction of resistor 106 and diode 107 through diode 129, the right output terminal of trigger 88 is connected to the junction of resistor 104 and diode 105 through diode 130 and the right output terminal of trigger 89 is connected to the junction of resistor 102 and diode 103 through diode 131. Diodes 122, 123, 124, 125, 126, 127, 128, 129, 130 and 131 are oriented as shown with their anode being connected to the appropriate junction and the cathode being connected to the right output terminal of the respective trigger. Noting that each of the triggers is by definition in an OFF condition representing a zero when its right output terminal is at a DOWN or −voltage level, this condition will cause each or the diodes 122 . . . or 131 to be forwardly biased. Each of the parallel constant current sources relating to a corresponding trigger are made ineffective whenever its corresponding diode 122 . . . or 131 is forwardly biased by reason of the fact that the corresponding diodes 121, 119, 117, 115, 113, 111, 109, 107, 105 and 103 which are normally reversibly biased whenever their corresponding diode 122 . . . or 131 is forwardly biased. Thus, the constant current generator for each order of significance is effective only when its corresponding trigger is in its ON condition and the corresponding diode 122 . . . or 131 is reversibly biased by reason of an UP level in the trigger.

An alternative embodiment utilizing the teachings of the present invention for a very similar radar display application is described in an article entitled "An Error-Sampled Sweep-Position Control System," pages 14–35, IBM Journal of Research and Development, vol. 2, No. 1, January 1958. It should also be understood that the reference magnitude level and polarity which is applied to comparing means 14 of FIG. 1 and differential amplifier 32 of FIG. 2 may vary as a function of time as desired within the scope of the teachings of the present invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A sampled-data control system for maintaining the origin of a PPI radar presentation coincident with the commencement of a sweep waveform comprising a deflection circuit in which it is desired to maintain a known direct current electrical component commensurate with the origin of said radar presentation, an amplifier for energizing said deflection circuit, a direct current coupled input to said amplifier, an alternating current coupled input to said amplifier for providing a sweep waveform input, a source of repetitive sample time signals each coincident with the commencement of the sweep voltage, a source of repetitive readout time signals coinciding with each recovery time of said electrical sweep waveform, differential means for continuously comparing the magnitude of the direct current electrical component of each electrical waveform with a reference magnitude, sampling means responsive to said differential means and said source of repetitive sample time signals for selectively sampling the direct current electrical component in the sweep circuit at the sample time for providing an analog error voltage pulse of constant width having a polarity and magnitude commensurate with the instantaneous error of the direct current electrical component in said sweep circuit at said sampling time, bidirectional means for converting and storing said analog error voltage as a digital quantity, time delay means for reading out and resetting said analog-to-digital conversion and storing means during each readout signal, a bidirectional digital accumulator responsive to said analog conversion and storing means, a digital-to-analog converter responsive to said bidirectional accumulator connected to the direct current coupled input of said amplifier for providing the direct current electrical component in said deflection circuit, the time period between each sample time signal and its corresponding readout time signal being equal to the time delay being desired.

2. A sampled-data control system for maintaining the origin of a PPI radar presentation coincident with a reference portion of a sweep waveform having a first tracking mode of operation and a second offset mode of operation comprising a deflection circuit in which it is desired to have a known direct current electrical component of a magnitude necessary to display the relative location of the radar at the geometric center of said radar presentation during the operating mode of operation and to have a known direct current electrical component of a magnitude necessary so that the slant range marker of the target always passes through the geometric center of the display of the radar presentation during the offset mode of operation, an amplifier for energizing said deflection circuit, a direct current coupled input to said amplifier, an alternating current coupled input to said amplifier, a source of repetitive sample time signals each coincident with the commencement of the sweep voltage for use during the tracking mode of operation, a source of repetitive sample time signals each coincident with the appearance of the target pulse on the sweep voltage for use during the offset mode of operation, a source of repetitive readout time signals coinciding with each recovery time of said electrical sweep waveform, a voltage source providing a reference magnitude during the tracking mode of operation, differential means for continuously comparing the magnitude of the direct current electrical component of each electrical waveform with the appropriate reference magnitude depending on the mode of operation, sampling means responsive to said differential means and said appropriate source of repetitive sample time signals for selectively sampling the direct current electrical component in each sweep circuit at sample time for providing an analog error voltage of a constant width having a polarity and magnitude commensurate with the instantaneous error of the direct current electrical component in said sweep circuit at said appropriate sample time, bi-directional means for converting and storing said analog voltage as a digital quantity, time delay means for reading out and resetting said analog-to-digital conversion and storing means at the selective readout time, a bi-directional digital accumulator responsive to said analog-to-digital conversion and storing means via said time delay means, a digital-to-analog converter responsive to said bidirectional accumulator connected to the direct current coupled input of said power amplifier for providing the direct current electrical component in said deflection circuit.

3. A sampled-data control system comprising an electrical load in which it is desired to maintain a constant direct current electrical component, a power amplifier for energizing said electrical load in accordance with a direct current coupled input and an alternating current coupled input, differential means for continuously monitoring the direct current electrical component and comparing that quantity with a reference magnitude, means for selectively sampling at a sampling reference time for providing an analog error voltage of constant width having a polarity and amplitude commensurate with the instantaneous variation of the direct current electrical component of said electrical load, bidirectional means for converting said analog error voltage to a digital quantity and storing said digital quantity, time responsive means for reading out and resetting said analog-to-digital conversion and storing means at a selected read-out time, a bidirectional digital accumulator responsive to said analog-to-digital converting and storing means under the control of said time responsive means, a digital-to-analog converter responsive to said bidirectional accumulator connected to the direct current coupled input of said power amplifier for providing the direct current electrical component in said electrical load, and said direct current component being the bidirectional integral of the input to said bidirectional digital accumulator.

4. A sampled-data control system comprising an electrical load in which it is desired to maintain a constant direct current electrical component, a power amplifier for energizing said electrical load, said amplifier having a direct current coupled input terminal, said amplifier having an alternating current coupled input, differential means for continuously sampling the direct current electrical component and comparing that quantity with a reference magnitude, a first source for providing a sample reference time signal, a second source for providing a readout time signal, means responsive to said differential means and said first source for selectively sampling the output of said differential means at a sample reference time for providing an analog error voltage pulse of constant width having a polarity and magnitude commensurate with the instantaneous error of the direct current electrical component in said electrical load at said sampling reference time, a bidirectional means for converting and storing said analog error voltage to a digital quantity, time delay means for reading out and resetting said analog-to-digital converting and storing means at the selected readout time, a bidirectional digital accumulator responsive to said analog-to-digital converting and storing means via said time delay means, a digital-to-analog converter responsive to said bidirectional accumulator connected to the direct current coupled input of said power amplifier for providing the direct current electrical component in said electrical load, the time period between said sampling reference times and corresponding readout time being equal to the time delay being provided, the rate at which said first source provides a sampling reference signal determines the error sampling data of said control system.

5. A sampled-data control system comprising an electrical load in which it is desired to maintain a known direct current electrical component, a summing means for energizing said electrical load, a direct current coupled input to said summing means, means for sampling the direct current electrical component of said electrical load at repetitive sample reference times and comparing that quantity with a reference magnitude level and polarity, each repetitive sample reference time being followed by a corresponding readout time, means responsive to said sampling and comparing means for altering the direct current electrical component input level at said summing means at repetitive readout times, the time period between a sampling reference time signal and a corresponding readout time signal being commensurate with the controlled time delay of said sampled-data control system, the repetitive rate of said sample reference signals being commensurate with the sampling rate of said control system.

6. A sampled-data control system with a controlled time delay comprising an electrical load in which it is desired to maintain a known direct current electrical component, an electrical summing means for energizing said electrical load, a direct current coupled input to said electrical summing means, a source of repetitive sample reference time signals, a source of repetitive readout time signals, each repetitive sample reference time signal being followed by a corresponding readout time signal, means for sampling in response to said source of sample reference time signals the deviations of the direct current electrical component of said electrical load from a reference magnitude reference level and polarity on the occurrence of each character reference and signal and converting the resultant sample to a digital error signal, digital-to-analog conversion means responsive to said digital error signal and said source of repetitive readout time signals for altering the direct current electrical component input level at said electrical summing means on the occurrence of a corresponding repetitive readout time signal, the time period between a sampling reference time signal and a corresponding readout signal being commensurate with the controlled time delay of said sampled-data control system, a repetitive rate of said sample reference time signals being commensurate with the sampling rate of said control system.

7. A sampled-data control system comprising an electrical load in which it is desired to maintain a constant electrical component, an amplifier for energizing said electrical load in accordance with its electrical input, differential means for continuously monitoring the electrical component and comparing its magnitude with that of a reference electrical quantity, means for selectively sampling at a sampling time for providing an analog voltage of constant width having a polarity and amplitude commensurate with the instantaneous variation of the electrical component within said electrical load from said reference magnitude, bidirectional means for converting and storing said analog error voltage to a digital quantity, time delay means for reading out and resetting said analog-to-digital conversion and storing means at a selected readout time, a bidirectional digital accumulator responsive to said analog-to-digital conversion and storing means through said time delay means, a digital-to-analog converter responsive to said bidirectional accumulator connected to said amplifier for providing the electrical component in said electrical load, said electrical component having a magnitude commensurate with the bidirectional integral of the input of said bidirectional accumulator.

8. A sampled-data control system comprising an electrical load in which it is desired to maintain a constant electrical component, an amplifier for energizing said electrical load in accordance with its electrical input, differential means for continuously monitoring the electrical component and comparing its magnitude with that of a reference electrical quantity, means for selectively sampling at a reference sampling time for providing an analog voltage pulse commensurate with the instantaneous variation of the electrical component within said electrical load from said reference magnitude, bidirectional means for converting and storing said analog error voltage to a digital quantity, time delay means for reading out and resetting said analog-to-digital conversion and storing means at a selected readout time, a bidirectional digital accumulator responsive to said analog-to-digital conversion and storing means through said time delay means, a digital-to-analog converter responsive to said bidirectional accumulator connected to said amplifier for providing the electrical component in said electrical load, said electrical component having a magnitude commensurate with the bidirectioinal integral of the input of said bidirectional accumulator.

9. A sampled-data control system comprising an electrical load in which it is desired to maintain a known electrical quantity; means for energizing said electrical load; means for sampling the deviation of said electrical quantity in said electrical load from a reference magnitude and polarity at selected sample reference times; each selected sample referenced time being followed by a corresponding selected readout time, means responsive to said sampling means for altering the electrical quantity in said load through said energization means at selected readout times; the time period between a sample reference time and a corresponding readout time being commensurate with the controlled time delay of said sampled-data control system.

10. A sampled-data control system comprising an electrical load in which it is desired to maintain a known electrical quantity; means for energizing said electrical load; a source of repetitive sample reference time signals; a source of repetitive readout time signals, each responsive sample reference time being followed by a corresponding readout time; means responsive to said source of sample time signals for sampling the deviations of said electrical quantity in said load from a reference magnitude and polarity at responsive sample reference times and deriving a digital error signal; means responsive to said sampling means and said source of readout signals for altering the electrical quantity in said load through said energization means at corresponding repetitive readout times, the time period between a sample reference time and a corresponding readout time being commensurate with the controlled time delay of said sampled data control system, the repetitive rate of said sample reference signals being commensurate with the sampling rate of said control system.

11. A sampled-data control system with a controlled time delay comprising an electrical load in which it is desired to maintain a known electrical quantity; means for energizing said electrical load; a source of repetitive sample reference time signals; a source of repetitive readout time signals, each repetitive sample reference time signal being followed by a corresponding readout time signal; means for comparing said electrical quantity in said load with a reference magnitude and polarity and deriving an analog error signal commensurate with any difference, means responsive to said source of repetitive reference signals for sampling and converting said analog error signal to an electrical digital error signal on the occurrence of each repetitive sample reference time signal, digital-to-analog conversion means responsive to said digital error signal and said source of repetitive readout signals for altering the electrical quantity in said load on the occurrence of each corresponding repetitive readout time signal, the time period between a sample reference time signal and a corresponding readout time signal being commensurate with the controlled time delay of said sampled-data control system, the repetitive rate of said sample reference signals being commensurate with the sampling rate of said control system.

12. A sampled-data control system with a controlled time delay comprising an electrical load in which it is desired to maintain a known electrical quantity; means for energizing said electrical load; a source of a repetitive sample reference times signals; a source of repetitive readout time signals, each repetitive sample reference time signal being followed by a corresponding readout time signal; means for comparing said electrical quantity in said load with a reference magnitude and polarity and deriving an analog error signal commensurate with any difference; means responsive to said source of sample reference times signals for sampling said analog error signal and converting said signal to a digital signal on the occurrence of each repetitive sample reference times; digital-to-analog conversion and integrating means responsive to said digital error signal for altering the electrical quantity in said electrical load through said energizing means on the occurrence of each corresponding repetitive readout time signal, the time period between each sampling reference time signal and a corresponding readout signal being commensurate with the controlled time delay of said sampled-data control system, the repetitive rate of said sample reference time signals being commensurate with the sampling rate of said control system.

References Cited in the file of this patent

UNITED STATES PATENTS

| | | |
|---|---|---|
| 2,865,564 | Kaiser | Dec. 23, 1958 |
| 2,883,532 | Hyder | Apr. 21, 1959 |
| 2,954,165 | Myers | Sept. 27, 1960 |